US012619545B2

(12) United States Patent
Pham et al.

(10) Patent No.: US 12,619,545 B2
(45) Date of Patent: May 5, 2026

(54) SYSTEMS AND METHODS FOR HEAT MAP GENERATION AND OPERATION

(71) Applicant: Samsung Electronics Co., Ltd., Suwon-si (KR)

(72) Inventors: Tung Pham, San Jose, CA (US); Andrew Chang, Los Altos, CA (US)

(73) Assignee: SAMSUNG ELECTRONICS, CO., LTD., Suwon-si (KR)

( * ) Notice: Subject to any disclaimer, the term of this patent is extended or adjusted under 35 U.S.C. 154(b) by 0 days.

(21) Appl. No.: 18/817,124

(22) Filed: Aug. 27, 2024

(65) Prior Publication Data
US 2025/0307160 A1 Oct. 2, 2025

Related U.S. Application Data

(60) Provisional application No. 63/573,377, filed on Apr. 2, 2024.

(51) Int. Cl.
G06F 12/0862 (2016.01)

(52) U.S. Cl.
CPC .. G06F 12/0862 (2013.01); G06F 2212/6022 (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS

| | | | |
|---|---|---|---|
| 7,529,891 | B2 | 5/2009 | Thekkath et al. |
| 9,342,443 | B2 | 5/2016 | Walker et al. |

(Continued)

FOREIGN PATENT DOCUMENTS

| | | |
|---|---|---|
| CN | 111143242 A | 5/2020 |

OTHER PUBLICATIONS

Yasuo Ishii, Mary Inaba, and Kei Hiraki. 2009. Access map pattern matching for data cache prefetch. In Proceedings of the 23rd international conference on Supercomputing (ICS '09). Association for Computing Machinery, New York, NY, USA, 499-500. https://doi.org/10.1145/1542275. 1542349 (Year: 2009).*
(Continued)

*Primary Examiner* — Daniel C. Chappell
(74) *Attorney, Agent, or Firm* — Lewis Roca Rothgerber Christie LLP

(57) ABSTRACT

A method of prefetching from a storage device connected to a host device, the method including: determining, by the storage device, a first region in a first heat map of the storage device, the first region in the first heat map including an address associated with an instruction received by the storage device from the host device; generating, by the storage device, one or more a prefetch request based on a temperature of the first region of the first heat map, the temperature of the first region of the first heat map corresponding to a number of times the first region of the first heat map is accessed by the host device; prefetching, by the storage device, data or instructions from the first region of the first heat map based on the prefetch request; and updating, a second heat map based on the instruction received from the host device.

18 Claims, 5 Drawing Sheets

(58) Field of Classification Search
CPC ............... G06F 3/00; G06F 3/06–0689; G06F
5/00–16; G06F 8/00–78; G06F 9/00–548;
G06F 11/00–3696; G06F 12/00–16; G06F
13/00–4295; G06F 15/00–825; G06F
16/00–986; G06F 18/00–41; G06F
17/00–40; G06F 21/00–88; G06F
2009/3883; G06F 2009/45562–45595;
G06F 2015/761–768; G06F 2201/00–885;
G06F 2206/00–20; G06F 2209/00–549;
G06F 2211/00–902; G06F 2212/00–7211;
G06F 2213/00–4004; G06F 2216/00–17;
G06F 2221/00–2153; G06N 3/00–126;
G06N 5/00–048; G06N 7/00–08; G06N
10/00; G06N 20/00–20; G06N
99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75
See application file for complete search history.

(56) References Cited

U.S. PATENT DOCUMENTS

| | | | |
|---|---|---|---|
| 9,367,466 | B2 | 6/2016 | Poremba et al. |
| 11,194,728 | B2 | 12/2021 | Roberts |
| 11,366,733 | B2 | 6/2022 | Kim |
| 11,442,654 | B2 | 9/2022 | Hsu et al. |
| 11,726,692 | B2 | 8/2023 | Szczepanik et al. |
| 2019/0354412 | A1 | 11/2019 | Bivens et al. |
| 2021/0303477 | A1 | 9/2021 | Doshi et al. |
| 2022/0164118 | A1 | 5/2022 | Hsu et al. |
| 2022/0350484 | A1 | 11/2022 | Vankamamidi et al. |
| 2023/0063123 | A1 | 3/2023 | Hyun |
| 2025/0156330 | A1* | 5/2025 | Kachare .............. G06F 12/0868 |

OTHER PUBLICATIONS

Learning I/O Access Patterns to Improve Prefetching in SSDs; Chakraborttil et al.; Jul. 1, 2020; retrieved from https://par.nsf.gov/biblio/10187652-learning-access-patterns-improve-prefetching-ssds (Year: 2020).*

Efficiently Prefetching Complex Address Patterns; Shevgoor et al.; Dec. 6-9, 2015; retrieved from https://users.cs.utah.edu/~rajeev/pubs/micro15m.pdf; DOI: http://dx.doi.org/10.1145/2830772.2830793 (Year: 2015).*

Jung-Hoon Lee, Seh-woong Jeong, Shin-Dug Kim and C. C. Weems, "An intelligent cache system with hardware prefetching for high performance," in IEEE Transactions on Computers, vol. 52, No. 5, pp. 607-616, May 2003, doi: 10.1109/TC.2003.1197127. (Year: 2003).*

S. Dong, X. Miao, P. Liu, X. Wang, B. Cui and J. Li, "HET-KG: Communication-Efficient Knowledge Graph Embedding Training via Hotness-Aware Cache," 2022 IEEE 38th International Conference on Data Engineering (ICDE), Kuala Lumpur, Malaysia, 2022, pp. 1754-1766, doi: 10.1109/ICDE53745.2022.00177. (Year: 2022).*

Kwon, Miryeong et al. (Jul. 10, 2023) "Cache in Hand: Expander-Driven CXL Prefetcher for Next Generation CXL-SSD," published in Proceedings of the 15th ACM Workshop on Hot Topics in Storage and File Systems, pp. 24-30. https://dl.acm.org/doi/abs/10.1145/3599691.3603406.

Z. Chen et al. (Oct. 27, 2010) "Hot Data-Aware FTL Based on Page-Level Address Mapping," published in 2010 IEEE 12th International Conference on High Performance Computing and Communications (HPCC), Melbourne, VIC, Australia, pp. 713-718. https://ieeexplore.ieee.org/document/5581420.

* cited by examiner

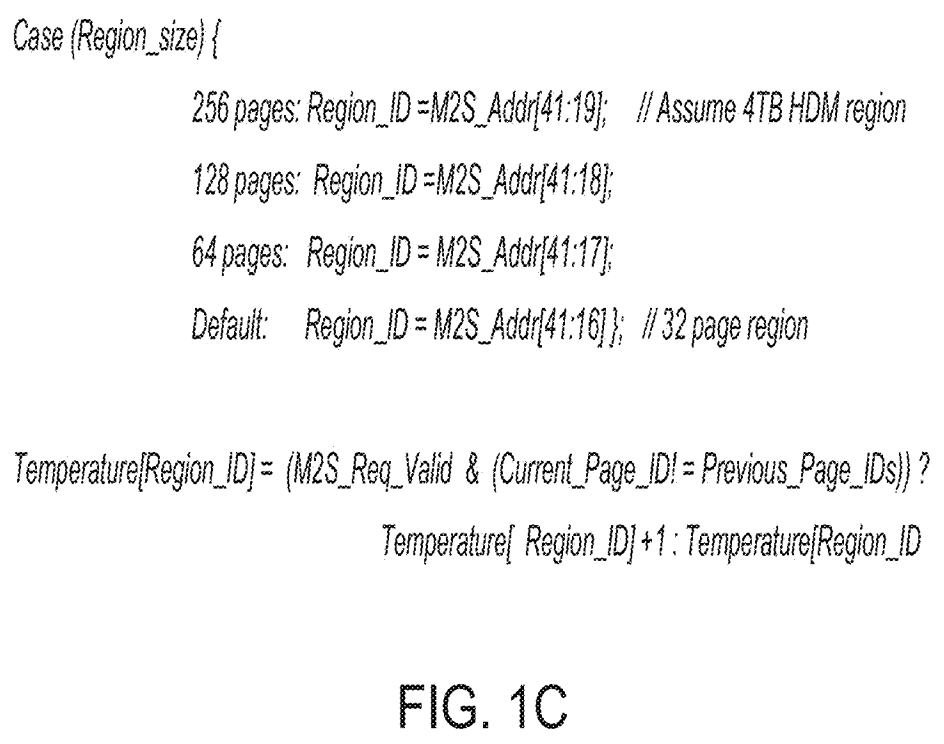

```
Case (Region_size) {

256 pages: Region_ID = M2S_Addr[41:19];    // Assume 4TB HDM region 128 pages:  Region_ID = M2S_Addr[41:18];

64 pages:   Region_ID = M2S_Addr[41:17];

Default:    Region_ID = M2S_Addr[41:16];   // 32 page region

Temperature[Region_ID] = (M2S_Req_Valid & (Current_Page_ID! = Previous_Page_IDs)) ?

Temperature[ Region_ID] + 1 : Temperature[Region_ID
```

FIG. 1C

SYSTEMS AND METHODS FOR HEAT MAP GENERATION AND OPERATION

CROSS REFERENCE TO RELATED APPLICATION

The present application claims priority to and the benefit of U.S. Provisional Patent Application No. 63/573,377, filed on Apr. 2, 2024, entitled "HW-BASED HEAT MAP GENERATION AND OPERATION," the entire disclosure of which is incorporated by reference herein.

BACKGROUND

1. Field

Aspects of embodiments of the present disclosure relate to memory devices. More specifically, aspects of embodiments of the present disclosure relate to systems and methods for heat map generation and operation for memory devices.

2. Description of the Related Art

Computer processors may use techniques like prefetching by retrieving instructions and/or data from their original storage location in a slower memory (e.g., a solid state drive (SSD)) to a faster local memory (e.g. a cache or a dynamic random access memory (DRAM)) ahead of use to increase performance.

The above information in the background section is only for enhancement of understanding of the background of the technology and therefore it should not be construed as admission of existence or relevancy of the prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

In one or more embodiments, a method of prefetching from a storage device connected to a host device, the method including: determining, by the storage device, a first region in a first heat map of the storage device, the first region in the first heat map including an address associated with an instruction received by the storage device from the host device; generating, by the storage device, a prefetch request based on a temperature of the first region of the first heat map, the temperature of the first region of the first heat map corresponding to a number of times the first region of the first heat map is accessed by the host device; prefetching, by the storage device, data or instructions from the first region of the first heat map based on the prefetch request; and updating, by the storage device, a second heat map based on the instruction received from the host device.

In one or more embodiments, the method further including: determining, by the storage device, based on information received from the host device that a rate of the prefetched data or instructions from the first region of the first heat map that are used by the host device is less than a threshold value; and switching, by the storage device, the second heat map with the first heat map.

In one or more embodiments, the method further including: determining, by the storage device, a first region in the second heat map of the storage device, the first region in the second heat map including the address associated with the instruction received from the host device; and incrementing, by the storage device, a temperature counter of the first region of the second heat map, a value of the temperature counter representing the temperature of the first region of the second heat map, and updating, by the storage device, the second heat map based on the value of the temperature counter of the first region of the second heat map, wherein the temperature of the first region of the second heat map corresponds to a number of times the first region of the second heat map is accessed by the host device.

In one or more embodiments, the first region in the first heat map and the first region of the second heat map are determined based on corresponding region IDs of the first region in the first heat map and the first region of the second heat map.

In one or more embodiments, wherein the prefetching further includes sending, by the storage device, the prefetched data or instructions from the first region of the first heat map to the host device; and the first heat map and the second heat map represent heat maps of the storage device at different times.

In one or more embodiments, the storage device is configured to update the second heat map based on the instruction received from the host device during a time period determined by the storage device.

In one or more embodiments, the instruction from the host device is received via a cache-coherent interconnect coupled between the host device and the storage device.

In one or more embodiments, the storage device including at least one of a finite state machine or a storage device controller.

In one or more embodiments, a size of each of a plurality of regions in the first heat map is different from a size of each of a plurality of regions in the second heat map.

In one or more embodiments, a system including: a host device; and a storage device communicatively coupled to the host device via a bus, the storage device being configured to: determine a first region in a first heat map of the storage device based on an instruction received by the storage device from the host device, generate a prefetch request based on a number of times the first region of the first heat map is accessed by the host device; prefetch data or instructions from the first region of the first heat map based on the prefetch request; send the prefetched data or instructions from the first region of the first heat map to the host device; and update a second heat map of the storage device based on the instruction received from the host device.

In one or more embodiments, the storage device is further configured to: determine based on information received from the host device that a rate of the prefetched data or instructions from the first region of the first heat map that are used by the host device is less than a threshold value; and switch the second heat map with the first heat map based on determining that the rate of the prefetched data or instructions from the first region of the first heat map is less than the threshold value.

In one or more embodiments, the first region in the first heat map includes an address associated with the instruction received by the storage device from the host device.

In one or more embodiments, the storage device is further configured to: determine a first region in the second heat map of the storage device, the first region in the second heat map including an address associated with the instruction received from the host device; increment a temperature counter of the first region of the second heat map, a value of the temperature counter representing a temperature of the first region of the second heat map; and update the second heat map based on the value of the temperature counter of the first region of the second heat map, wherein the temperature of the first region of the second heat map corresponds to a number of times the first region of the second heat map is accessed by the host device.

In one or more embodiments, the first region in the first heat map and the first region of the second heat map are determined based on corresponding region IDs of the first region in the first heat map and the first region of the second heat map.

In one or more embodiments, the first heat map and the second heat map represent heat maps of the storage device at different times.

In one or more embodiments, the storage device is configured to update the second heat map based on the instruction received from the host device during a time period determined by the storage device.

In one or more embodiments, the bus includes a cache-coherent interconnect coupled between the host device and the storage device.

In one or more embodiments, the storage device includes at least one of a finite state machine or a storage device controller, and the storage device includes a solid state drive.

In one or more embodiments, a non-transitory computer readable medium including stored instructions, which when executed by a storage device, cause the storage device to: determine a first region in a first heat map of the storage device based on an instruction received by the storage device from a host device connected to the storage device, generate a prefetch request based on a number of times the first region of the first heat map is accessed by the host device; prefetch data or instructions from the first region of the first heat map based on the prefetch request; send the prefetched data or instructions from the first region of the first heat map to the host device; and update a second heat map of the storage device based on the instruction received from the host device.

In one or more embodiments, the storage device including at least one of a finite state machine or a storage device controller, and the storage device includes a solid state drive.

BRIEF DESCRIPTION OF THE DRAWINGS

The above and other aspects and features of embodiments of the present disclosure will become more apparent by describing in further detail embodiments thereof with reference to the accompanying drawings, in which:

FIG. 1C shows instructions from the storage device circuit to create the training heat map, according to one or more embodiments of the present disclosure;

DETAILED DESCRIPTION

Figure 1A:
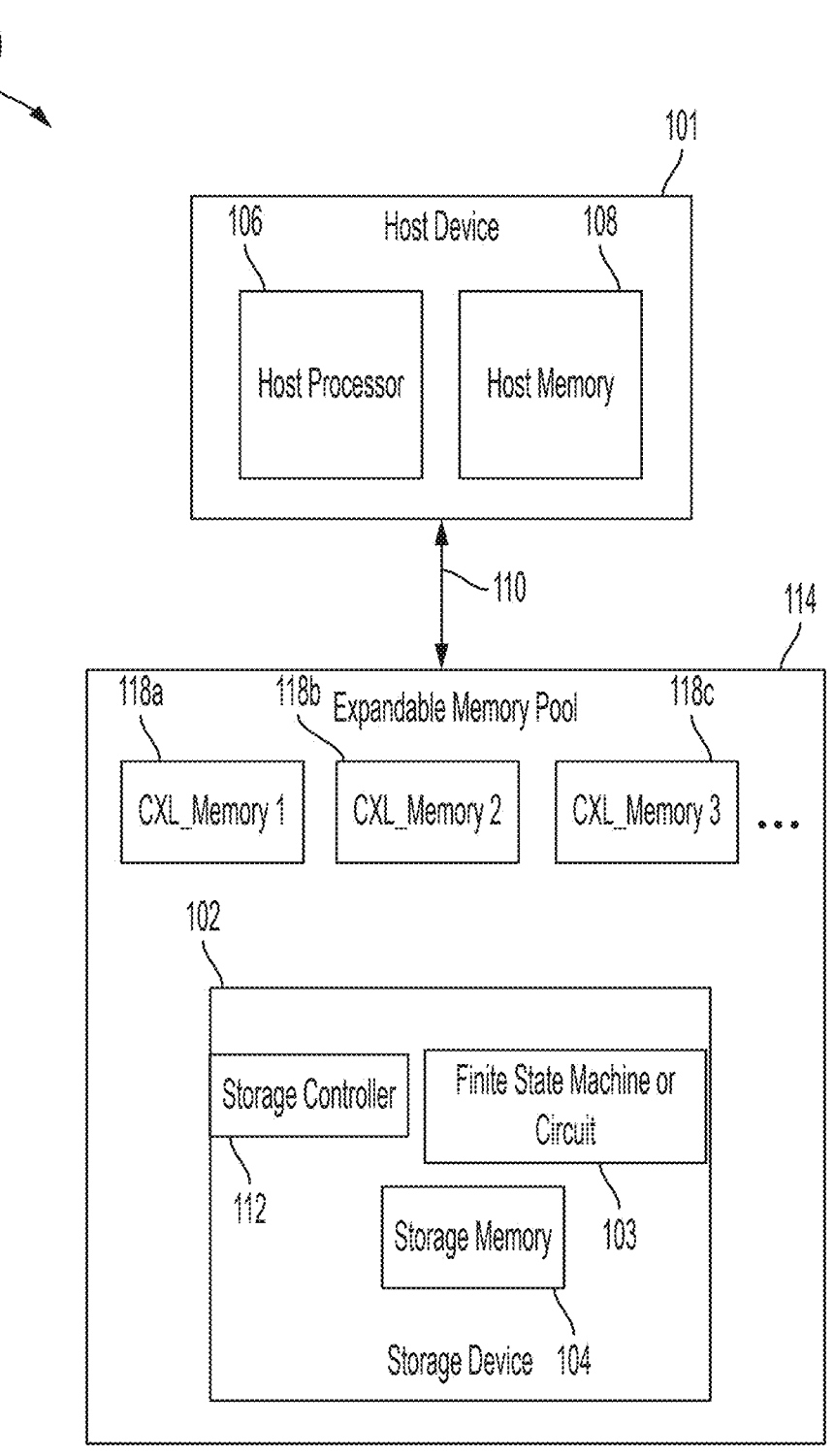
FIG. 1A is a block diagram illustrating a host device connected to a peripheral HDM device via a bus, according to one or more embodiments of the present disclosure.

Aspects and features of embodiments of the present disclosure and method of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

Throughout the present disclosure, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the present disclosure. Throughout the present disclosure, in a case where a certain portion "includes", the case means that the portion may further include another component without excluding another component unless otherwise stated. "At least one of X, Y, and Z", "at least one of X, Y, or Z", and "at least one selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Here, terms such as first and second may be used to describe various components, but these components are not limited to these terms. These terms are used to distinguish one component from another component. Therefore, a first component may refer to a second component within a range without departing from the spirit and scope of the present disclosure.

Spatially relative terms such as "under", "on", and the like may be used for descriptive purposes, thereby describing a relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned "under" other elements or features are positioned in a direction "on" the other elements or features. Therefore, in one or more embodiments, the term "under" may include both directions of on and under. In addition, the device may face in other directions (for example, rotated 90 degrees or in other directions) and thus the spatially relative terms used herein are interpreted according thereto.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, some embodiments of the present disclosure are described in more detail with reference to the attached drawings.

In computer memory, memory hierarchy helps in optimizing availability of memory for different computer operations. In a memory system, storage devices with different capacities, costs, and access times may be divided into different levels of the memory hierarchy. For example, in a computer memory system, central processing unit (CPU) registers may hold the most frequently used data and may be at level zero of the memory hierarchy. Cache memories that are relatively small, fast, and are located nearby the CPU, may temporarily store frequently used data and instructions (e.g., hot data/instructions) that are stored in the relatively slow memory locations, for quick access by the CPU. Therefore, cache memories (e.g., a static random-access memory (SRAM)) may be at level one of the memory hierarchy. Similarly, the main memory (e.g., DRAM) may be at level two of the memory hierarchy, the secondary storage devices (e.g., hard disk drives (HDD) and solid-state drives (SSD)) may be at level three of the memory hierarchy, and so on and so forth. As the hierarchy level of the different memories increases (e.g., goes up), the storage capacity also increases (e.g., goes up). However, memories at higher hierarchy levels may have higher access latency compared to those of the memories at lower hierarchy levels. Computer programs tend to access the storage at a lower hierarchy level more frequently than they access the storage at the next level. Therefore, the storage at the higher hierarchy levels are typically slower and larger.

Computer processors may use techniques like prefetching by retrieving instructions and/or data from their original storage location in a slower memory (e.g., an SSD) to a faster local memory (e.g. a cache or a DRAM) ahead of use to increase performance. Prefetching data ahead of use may alleviate the processor-memory performance gap by overlapping long latency memory accesses with useful computation. For example, because of the long access latency of the SSD, efficient prefetch to the slow SSD memory to bring expected data to the faster DRAM cache may be critical to tiered memory performance.

A heat map may be used to represent data to show distribution and/or density of values (e.g., vector/array of values) and to identify patterns and/or trends in a large dataset. Heat maps provide a comprehensive representation of data that may be used in a decision-making process.

A memory heat map represents how many times a particular memory region was accessed during a certain time interval. A memory region is divided into cells, and each cell may keep a count of the number of accesses to the cell for a specific time interval (e.g., a temperature of the cell). The heat map of an entire computer memory may reveal patterns of usage of the different memory locations. Therefore, the heat map provides historical data and may be used as an indication to prefetch data. As such, the prefetch prediction may be based on the heat map of the memory, which divides the tiered memory into a plurality (e.g., many) uniformed regions. Depending on the temperature of the requested region, one or more prefetch requests may be generated.

Compute Express Link (CXL) is a high speed interconnect for communications between the CPU, memory, and the memory on attached devices. CXL allows the secondary storage devices (e.g., HDD, SSD) to be directly attached to the host ecosystem, so that the additional memory of the external storage devices may appear as if they are part of the host system memory. Based on how frequently the data/information stored in the memory devices connected to the CPU via the CXL bus are accessed, the traffic on the CXL bus may change, and thus, the overall memory heat map may change as well. As such, because the traffic on the CXL bus is dynamic, a fixed or static heat map may be out of date quickly.

Because the prefetch prediction may be based on the heat map of the memory, due to the frequently changing heat map, a successful and/or accurate prefetch may not be possible if a static heat map is used to predict the prefetching operation. Thus, dynamically adjusting the memory heat map in real time may be desired for effective prefetching.

Accordingly, one or more embodiments of the present disclosure may provide systems and methods for heat map generation and operation. For example, in some embodiments, a hardware (HW) based heat map generating and operating method may be used to effectively prefetch data and/or information from the slower memory locations (e.g., SSD) to the faster memory locations (e.g., DRAM cache) by dynamically adjusting the memory heat map in real time.

For example, a high density memory (HDM) may be a host computer managed memory that is outside of the host computer or the host DRAM. HDM may have different latency than that of the host DRAM, because they are attached to the host computer through a cache coherent protocol-based interconnect, for example, such as a compute express link (CXL) interconnect. HDM memory may be an SSD connected to the host processor via the cache coherent protocol-based interconnect.

A heat map of a memory (e.g., a HDM memory) may include multiple uniform regions that cover the entire memory range (e.g., the HDM memory range). Each region may have a specific size (e.g., a granularity). For example, each region of the heat map may cover multiple contiguous pages (e.g., 4 KB-pages) of the HDM memory. The page size may vary depending on the desired grain control. For example, if fine grain control is desired, each region of the heat map may include (e.g., may consist of) a smaller number of contiguous pages (e.g., 16, 32, 64 pages) of the HDM memory. However, if coarse grain control is desired, each region of the heat map may include (e.g., may consist of) a larger number of contiguous pages (e.g., 128-512 pages) of the HDM memory. Each region of the heat map counts the number of accesses to the region in a specified time interval (e.g., the temperature of each region). For example, each region may have 4 to 8 bits for a temperature indicator, where a higher value indicates a hotter region. The temperature of each region of the heat map, on its own, may not reveal useful information due to variations that may be caused by numerous factors. However, the state of the entire map may reveal important system activities. The status of the regions in the heat map may be used for prefetching prediction.

FIG. 1A is a system diagram of a storage system, according to one or more embodiments of the present disclosure.

In brief overview, the storage system 100 according to one or more embodiments of the present disclosure may include a host device (e.g., a host computer) 101 coupled to a memory pool (e.g., an expandable memory pool) 114 via a communication link 110 (e.g., a storage interface, for example, a cache coherent protocol-based interconnect, such as a CXL interconnect (e.g., CXL over Peripheral Component Interconnect Express (PCIe), CXL over Ethernet, etc.) or a bus). In one or more embodiments, the communication link 110 may be a network that may include various types of communication links, such as Ethernet. In one or more embodiments, the memory pool 114 may be an expandable memory pool in which storage capacity may be increased using external memories, as needed.

The memory pool 114 may include one or more memory devices 118a, 118b, and 118c, and a storage device 102. For example, the memory devices 118a, 118b, and 118c, and the storage device 102 may be any types of suitable memory devices and/or storage devices. For example, the memory devices 118a, 118b, and 118c and the storage device 102 may include (or may be) any suitable storage devices, for example, a magnetic storage device (e.g., a hard disk drive (HDD), and the like), an optical storage device (e.g., a Blue-ray disc drive, a compact disc (CD) drive, a digital versatile disc (DVD) drive, and the like), a solid state drive (SSD), NAND flash memories, other kinds of flash memory devices (e.g., a USB flash drive, and the like), and/or the like. In one or more embodiments, the memory devices 118a, 118b, and 118c, and the storage device 102 may be CXL memory devices. For example, in some embodiments, the memory pool 114 may be a CXL memory pool (e.g., a disaggregated CXL memory pool) including a plurality of different types of CXL memory storage devices, which may include hard disk drives (HDD), solid-state drives (SSD), and/or the like. In one or more embodiments, when the memory pool 114 is a disaggregated CXL memory pool, the memory devices in the memory pool 114 may be connected over a high speed backplane. However, the present disclosure is not limited thereto, and the memory pool 114 may include (or may be) any suitable high performing memory (e.g., a suitable high performing expandable memory) for the host device 101 as would be known to those skilled in the art, similar to the examples described below for the host memory 108. Hereinafter, the storage device 102 may be described in more detail, but each of the memory devices (e.g., the expandable memory devices) 118a to 118c shown in FIG. 1A may have the same or substantially the same structure and/or configuration as that of the storage device 102.

The host device 101 may issue commands to the storage device 102 (and/or to any one of the memory devices 118a to 118c), such that the storage device 102 (and/or any one of the memory devices 118a to 118c) retrieves data stored therein associated with the commands. For example, the host device 101 may be communicably connected to the storage device 102 (e.g., over the communication link 110), and may issue a READ command to the storage device 102, such that data corresponding to the READ command is retrieved (e.g., READ) from the storage device 102 and transmitted to the host device 101. Once all of the data has been successfully transmitted to the host device 101, the storage device 102 may transmit an appropriate response to the host device 101, indicating that all of the data associated with the READ command has been successfully transmitted.

In more detail, referring to FIG. 1A, the host device 101 may include a host processor 106 and host memory 108. The host processor 106 may be a general purpose processor, for example, such as a central processing unit (CPU) core of the host device 101. The host memory 108 may be considered as high performing main memory (e.g., primary memory) of the host device 101. For example, in some embodiments, the host memory 108 may include (or may be) volatile memory, for example, such as dynamic random-access memory (DRAM). However, the present disclosure is not limited thereto, and the host memory 108 may include (or may be) any suitable high performing main memory (e.g., primary memory) replacement for the host device 101 as would be known to those skilled in the art. For example, in other embodiments, the host memory 108 may be relatively high performing non-volatile memory, such as NAND flash memory, Phase Change Memory (PCM), Resistive RAM, Spin-transfer Torque RAM (STTRAM), any suitable memory based on PCM technology, memristor technology, and/or resistive random access memory (ReRAM) and can include, for example, chalcogenides, and/or the like.

The storage device 102 may be considered as secondary memory that may persistently store data accessible by the host device 101. In this context, the storage device 102 may include (or may be) relatively slower memory when compared to the high performing memory of the host memory 108. For example, in some embodiments, the storage device 102 may be secondary memory of the host device 101, for example, such as a solid state drive (SSD). However, the present disclosure is not limited thereto, and in other embodiments, the storage device 102 may include (or may be) any suitable storage device, for example, such as a magnetic storage device (e.g., a hard disk drive (HDD), and the like), an optical storage device (e.g., a Blue-ray disc drive, a compact disc (CD) drive, a digital versatile disc (DVD) drive, and the like), other kinds of flash memory devices (e.g., a USB flash drive, and the like), and/or the like. In various embodiments, the storage device 102 may conform to a large form factor standard (e.g., a 3.5 inch hard drive form-factor), a small form factor standard (e.g., a 2.5 inch hard drive form-factor), an M.2 form factor, an E1.S form factor, and/or the like. In other embodiments, the storage device 102 may conform to any suitable or desired derivative of these form factors.

For convenience, the storage device 102 may be described in more detail hereinafter in the context of an SSD, but the present disclosure is not limited thereto.

The storage device 102 (as well as each of the CXL_memory devices 118a to 118c) may be communicably connected to the host device 101 over the communication link 110. The communication link 110 may facilitate communications (e.g., using a connector and a protocol) between the host device 101 and the storage device 102. In some embodiments, the communication link 110 may facilitate the exchange of storage requests and responses between the host device 101 and the storage device 102. In some embodiments, the communication link 110 may facilitate data transfers by the storage device 102 to and from the host memory 108 of the host device 101. For example, in one or more embodiments, the communication link 110 (e.g., the connector and the protocol thereof) may include (or may conform to) a cache coherent protocol-based interconnect, for example, such as a compute express link (CXL) interconnect, and/or the like. However, the present disclosure is not limited thereto, and in other embodiments, the communication link 110 (e.g., the connector and protocol thereof) may conform to other suitable storage interfaces, for example, such as Peripheral Component Interconnect Express (PCIe), remote direct memory access (RDMA) over Ethernet, Serial Advanced Technology Attachment (SATA), Fiber Channel, Non Volatile Memory Express (NVMe), NVMe over Fabric (NVMe-oF), and/or the like. In other embodiments, the communication link 110 (e.g., the connector and the protocol thereof) may include (or may conform to) various general-purpose interfaces, for example, such as Ethernet, Universal Serial Bus (USB), and/or the like.

For convenience, the communication link 110 may be described in more detail hereinafter in the context of a cache coherent protocol-based interconnect, for example, such as a compute express link (CXL) interconnect, but the present disclosure is not limited thereto.

In some embodiments, the storage device 102 may include a storage controller 112, a storage memory 104, and a hardware module (e.g., a finite state machine or a heat map training circuit 103, such as a finite state machine implemented with a plurality of flip flops). For example, the storage device 102 may receive a command (e.g., a READ command) from the host device 101 over the communication link 110, and may transmit the command to the storage controller 112 to retrieve data associated with the command from the storage memory 104. The storage controller 112 may provide an interface to control, and to provide access to and from, the storage memory 104. For example, the storage controller 112 may include at least one processing circuit embedded thereon for interfacing with the storage memory 104. The processing circuit may include, for example, a digital circuit (e.g., a microcontroller, a microprocessor, a digital signal processor, or a logic device (e.g., a field programmable gate array (FPGA), an application-specific integrated circuit (ASIC), and/or the like)) capable of executing data access instructions (e.g., via firmware and/or software) to provide access to and from the data stored in the storage memory 104 according to the data access instructions. For example, the data access instructions may include any suitable data storage and retrieval algorithm (e.g., READ/WRITE) instructions, and/or the like. The storage memory 104 may persistently store the data received from the host device 101 in a plurality of logical blocks. For example, in some embodiments, the storage memory 104 may include non-volatile memory, for example, such as NAND flash memory. However, the present disclosure is not limited thereto, and the storage memory 104 may include any suitable memory depending on a type of the storage device 102 (e.g., magnetic disks, tape, optical disks, and/or the like).

In one or more example embodiments, the hardware module of the storage device 102 may further include a finite state machine (e.g., a sequence control logic or a control logic). The finite state machine or the heat map training circuit 103 may include a plurality of combinational logic circuits, such as a plurality of flip flops, to perform a vast range or logic operations.

Figure 1B:
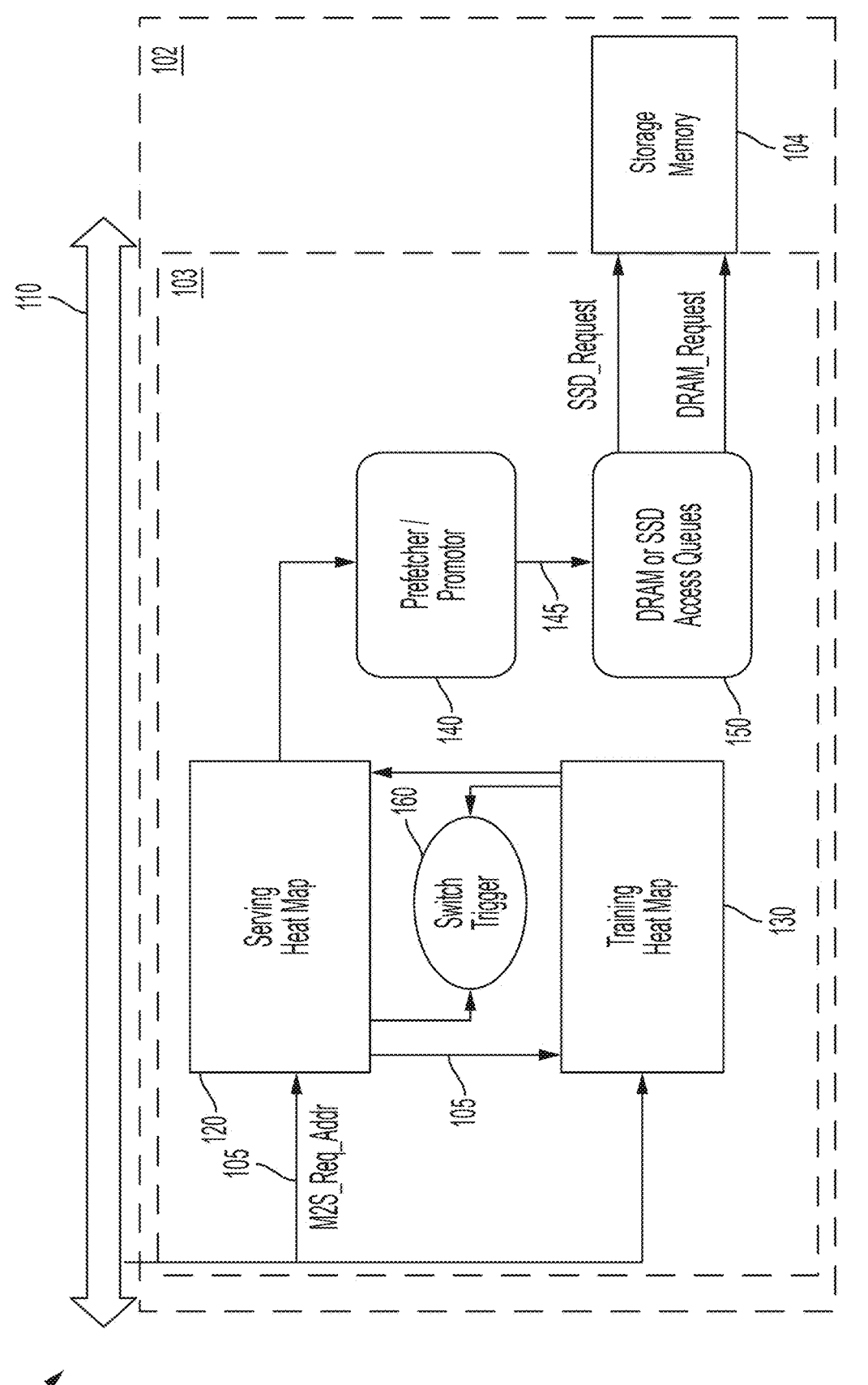
FIG. 1B is a block diagram of a method for generating a hardware based heat map, according to one or more embodiments of the present disclosure.

FIG. 1B is a block diagram of a method 107 for generating a hardware based heat map according to one or more embodiments of the present disclosure. The method of FIG. 1B may be performed by the finite state machine or the heat map training circuit 103 or the storage controller 112 of the storage device 102. However, because, each of the memory devices 118a to 118c shown in FIG. 1A may have the same or substantially the same structure and/or configuration as that of the storage device 102, the method of FIG. 1B may be performed by a finite state machine or a storage controller of any one of the memory devices 118a to 118c.

For example, FIG. 1B illustrates different blocks representing the functional partitions in the finite state machine or the heat map training circuit 103 inside the storage device 102 (e.g., the SSD) that generates the serving and the training heat maps 120 and 130, generates the prefetch request 145 by a prefetcher or promotor 140 based on the serving heat map 120, and sends the prefetch request 145 to the DRAM or SSD access queues 150 to prefetch data/instruction from the target region of the storage memory 104. For example, in one or more embodiments, the prefetcher 140 may be a control logic that issues read commands to the storage memory 104 of the storage device 102 (e.g., the SSD) to promote data from a slower tier of memory (e.g., the storage memory 104) to a faster tier of memory (e.g., host memory 108) ahead of its execution. For example, in one or more embodiments, the finite state machine or the heat map training circuit 103 may include a finite state machine (e.g., a finite state machine comprising a plurality of combinational logic circuits), an SSD controller (e.g., a field programmable gate array (FPGA)), and/or the like.

There are two heat maps that are illustrated in FIG. 1B, a serving heat map 120 and a training heat map 130. The serving heat map 120 and the training heat map 130 may be heat maps of the same memory region of the storage device 102 at different times. For example, the serving heat map 120 may be a heat map (e.g., a predetermined heat map) of the storage device 102, and may be generated at a previous time. The serving heat map 120 may be used for the storage device (e.g., the SSD) prefetching prediction. The training heat map 130 may be a dynamic heat map of the storage device 102 that is being trained in a current time using current traffic information of the communication link 110. For example, during the training period of the training heat map 130, the serving heat map is used to prefetch data and/or instructions from the storage memory 104 (to send to the host memory 108), and the training heat map 130 may be trained in the background and updated in real-time based on the current traffic patterns in the communication link 110. In some embodiments, the serving heat map 120 and the training heat map 130 may have different levels of granularity from each other. For example the serving heat map 120 may have a course granularity and the training heat map 130 may have a fine granularity or vice-versa. However, the present disclosure is not limited thereto, and the serving heat map 120 and the training heat map 130 may have the same or substantially the same granularity as each other.

For example, when the host device 101 sends a read or write request to the storage device 102 (e.g., or the memory devices 118a to 118c) via the communication link 110, the read or write request from the host device 101 may be received as a controller/agent address request (M2S_Req_Addr) instruction 105 at the serving heat map 120 as well as at the training heat map 130. The requested read/write address from the host device 101 may be indexed into the serving heat map 120 and the training heat map 130. However, in one or more embodiments, the host device 101 may send a read or write request to an expander that includes an SSD and receives byte level load/store requests (rather than block level read/write requests). In one or more embodiments, the expander may present itself as a memory device that operates on load/store instructions, but uses SSD and/or relatively small memory to provide addressable memory space with prefetching from SSD to reduce latency.

The instruction 105 may trigger a lookup in the serving heat map 120, which may provide a temperature value of the target region. For example, the target region may be the region in which the requested read/write address from the host device 101 is located. For example, when a read or write request from the host device 101 is received as the instruction 105, the finite state machine or the heat map training circuit 103 may determine the region of the serving heat map 120 in which the address associated with the instruction 105 is located based on region identities or identifiers (IDs) of different regions in the serving heat map 120. Once the target region is identified, a temperature counter of the target region may be used to check or track the temperature of the target region of the serving heat map 120.

Depending on the temperature of the target region in the serving heat map 120, a number of prefetch actions can be scheduled by the prefetcher or promotor 140. For example, if the target region in the serving heat map 120 is hot (e.g., the region is being accessed frequently), multiple prefetch requests 145 (e.g., Pn, P(n+1), P(n+2), P(n+3), etc. that include addresses in a memory region) may be generated by the prefetcher or promotor 140. However, if the target region in the serving heat map 120 is cold (e.g., the region is not being accessed frequently), no prefetch requests may be generated. On the other hand, if the temperature of the target region is medium (e.g., the region is being accessed less frequently than a hot region, but more frequently than a cold region), fewer prefetch requests than those of the hot region may be generated. The prefetch request 145 may be sent to the SSD access queues 150 to prefetch data/instruction from the target region of the storage memory 104 to send to the host memory 108.

Each prefetch generated based on the serving heat map 120 may receive a hit indicator or a miss indicator from the host request look up (e.g., a counter in the host device 101 that keeps track of how many prefetched data/information are being used by the host processor 106). For example, if a prefetch from the storage device 102, which was generated based on the serving heat map 120, is being used by the host processor 106, that prefetch may be considered as a hit. However, if a prefetch from the storage device 102 is not being used by the host processor 106, that prefetch may be considered as a miss. The hit or miss statistics from the host device 101 may be used for performance evaluation of the serving heat map 120, and/or to switch the serving heat map 120 with the training heat map 130.

In order to generate the training heat map 130, the finite state machine or the heat map training circuit 103 may configure (e.g., may preset) the granularity of the heat map. For example, FIG. 1C may show some example instructions from the finite state machine or the heat map training circuit 103 to create the training heat map 130. For example, a memory heat map may include a plurality of uniform regions that cover the entire memory range. In one or more embodiments, the finite state machine or the heat map training circuit 103 may define a region size for the training heat map as 256 pages (e.g., a size of each page being 4K), while using upper bits (e.g., 41:19) of the memory region as a region ID (e.g., 256 pages: Region_ID=M2S_Addr[41: 19]). In another embodiment, the finite state machine or the heat map training circuit 103 may define a region size for the training heat map as 128 pages (e.g., a size of each page being 4K), while using upper bits (e.g., 41:18) of the memory region as a region ID (e.g., 128 pages: Region_ID=M2S_Addr[41:18]). In some other embodiments, the finite state machine or the heat map training circuit 103 may define a region size for the training heat map as 64 pages (e.g., a size of each page being 4K), while using upper bits (e.g., 41:17) of the memory region as a region ID (e.g., 64 pages: Region_ID=M2S_Addr[41:17]).

Each region of the training heat map 130 may have its corresponding temperature counter to measure the temperature of the region during the training period. For example, when a read or write request from the host device 101 is received as the instruction 105, the finite state machine or the heat map training circuit 103 may determine the region of the training heat map 130 in which the address associated with the instruction 105 is located based on the region IDs of different regions in the training heat map 130. Once the region is identified, the temperature counter corresponding to the region of the training heat map 130 may be incremented (e.g., Temperature[Region_ID]=(M2S_Req_Valid & (Current_Page_ID !=Previous_Page_IDs))?; Temperature[Region_ID]+1:Temperature[Region_ID]). Accordingly, the training heat map may be generated by identifying in real-time, based on the traffic in the communication link 110, the regions of the training heat map 130 which are being accessed by the host device 101 (e.g., based on the region ID) and incrementing the corresponding temperature counters. Once a temperature counter reaches its maximum value, it may not be incremented anymore despite the corresponding region of the training heat map 130 being accessed by the host device 101.

A training period for the training heat map 130 may vary, and for example, may be a few minutes. For example, in one or more embodiments, the finite state machine or the heat map training circuit 103 may configure (e.g., may set) the training period of the training heat map 130 to be 30 minutes to reflect the application elapse time. In one or more embodiments, the training period may start periodically (e.g., the training period may start every 15 minutes), or may be initiated by the finite state machine or the heat map training circuit 103.

The training heat map 130 may be switched with the serving heat map 120 by a switch trigger 160. For example, in one or more embodiments, the training heat map 130 may be switched with the serving heat map 120 periodically (e.g., unconditional periodic switching every 10 minutes). In one or more embodiments, the switching between the training heat map 130 and the serving heat map 120 may be initiated by the switch trigger 160 based on instructions from the finite state machine or the heat map training circuit 103 of the storage device 102. In one or more embodiments, the hit or miss statistics from the host device 101 may be used for performance evaluation of the serving heat map 120, and/or to switch the serving heat map 120 with the training heat map 130. For example, if the cache hit rate is lower than a threshold value, the training heat map 130 may be switched with the serving heat map 120. The threshold value of the cache hit for switching the training heat map 130 with the serving heat map 120 may be determined by the finite state machine or the heat map training circuit 103.

Figure 1D:
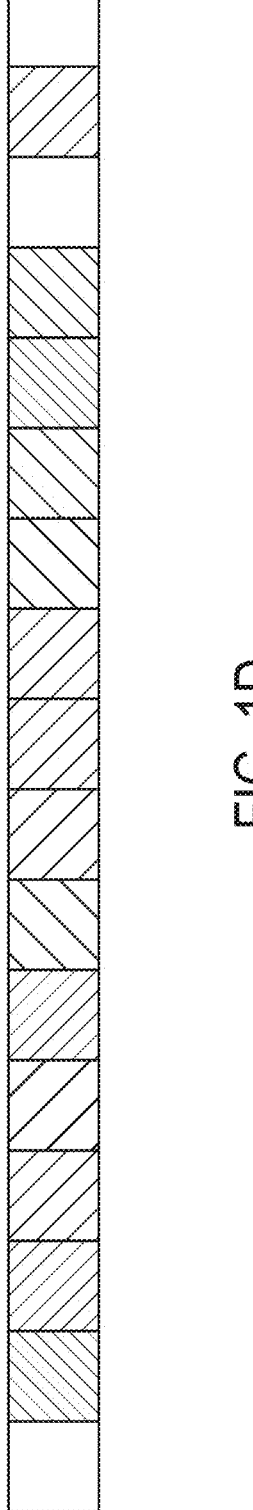
FIG. 1D illustrates a heat map, according to one or more embodiments of the present disclosure.
Figure 1D:

FIG. 1D illustrates a heat map, according to one or more embodiments of the present disclosure. For example, the heat map illustrated in FIG. 1D may be the training heat map 130 or the serving heat map 120. In one or more embodiments, the temperatures of the different regions of the heat map may be represented by different colors, shades, patterns, representative values, and/or the like. However, the present disclosure is not limited thereto. For example, if a region in the heat map is hot (e.g., if the region is being accessed frequently), the region may be represented by numbers, a color, a shade, a pattern, and/or the like, which is different from a region in the heat map that is cold (for example, if the region is not being accessed frequently), and/or from a region in the heat map with a medium temperature (for example, if the region is being accessed less frequently than a hot region but more frequently than a cold region).

Figure 2:
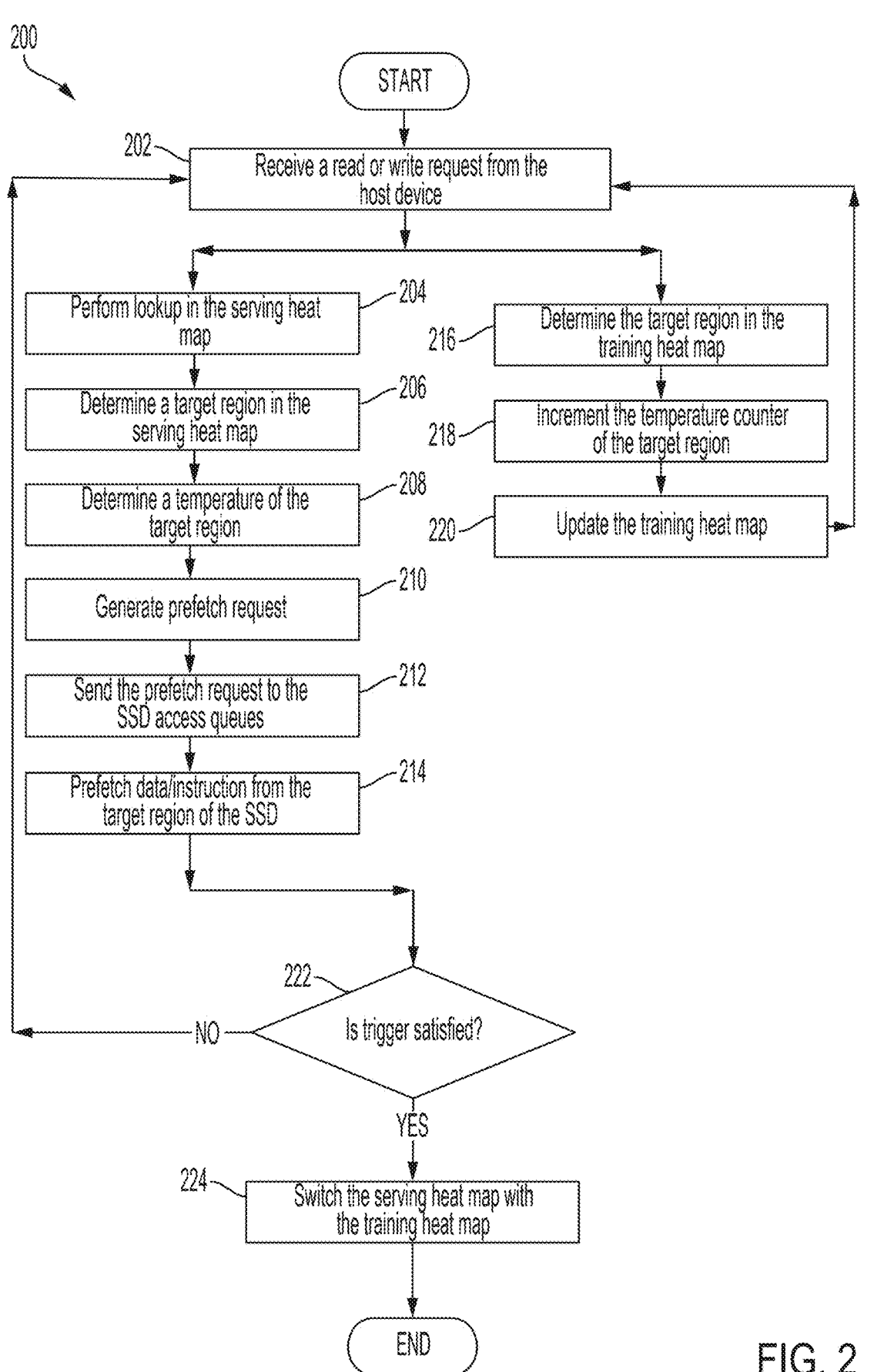
FIG. 2 illustrates a flowchart illustrating a method of generating a hardware based heat map, according to one or more embodiments of the present disclosure.

FIG. 2 illustrates a flowchart illustrating a method of generating a hardware based heat map according to one or more embodiments of the present disclosure. However, the present disclosure is not limited to the sequence or number of the operations of the method 200 shown in FIG. 2, and can be altered into any desired sequence or number of operations as recognized by a person having ordinary skill in the art. For example, in some embodiments, the order may vary, or the method may include fewer or additional operations.

Referring to FIG. 2, the method 200 may start, and a read or write request may be received from a host device at block 202. For example, when the host device 101 sends a read or write request to the storage device 102 via the bus 110, the read or write request from the host device 101 may be received as an instruction 105 at the serving heat map 120 as well as at the training heat map 130. The requested read/write address from the host device 101 may be indexed into the serving heat map 120 and the training heat map 130 (e.g., by the storage controller 112 and/or the finite state machine or the heat map training circuit 103).

A lookup may be performed in the serving heat map at block 204. For example, the instruction 105 may trigger a lookup in the serving heat map 120.

A target region in the serving heat map may be identified at block 206. For example, the target region may be identified in the serving heat map 120 based on the region ID of the target region. For example, when a read or write request from the host device 101 is received as the instruction 105, the finite state machine or the heat map training circuit 103 may determine the region of the serving heat map 120 in which the address associated with the instruction 105 is located based on the region IDs of different regions in the serving heat map 120.

A temperature of the target region may be determined at block 208. For example, once the target region is identified, a temperature counter of the target region may be checked to determine the temperature of the target region of the serving heat map 120.

A prefetch request may be generated at block 210. For example, depending on the temperature of the target region in the serving heat map 120, a number of prefetch requests may be generated by the prefetcher or promotor 140. For example, if the target region in the serving heat map 120 is hot (e.g., the region is being accessed frequently), multiple prefetch requests 145 (e.g., Pn, P(n+1), P(n+2), P(n+3), etc.) may be generated by the prefetcher or promotor 140. However, if the target region in the serving heat map 120 is cold (e.g., the region is not being accessed frequently), no prefetch requests may be generated. On the other hand, if the temperature of the target region is medium (e.g., the region is being accessed less frequently than the hot region, but more frequently than the cold region), fewer prefetch requests than the hot region may be generated.

The prefetch request may be sent to the DRAM or SSD access queues at block 212. For example, the prefetch request 145 may be sent to the DRAM or SSD access queues 150 to prefetch data/instruction from the target region of the storage memory 104.

Data/instruction may be prefetched from the target region of the storage device (e.g., an SSD) at block 214. For example, the data/instruction may be prefetched from the target region of the storage device (e.g., an SSD) and sent to the host device 101 to be used by the host processor 106 of the host device 101.

Concurrently (e.g., at the same time or substantially simultaneously) with block 204, the target region in the training heat map may be determined at block 216. For example, the finite state machine or the heat map training circuit 103 may determine the region of the training heat map 130 in which the address associated with the instruction 105 is located based on the region IDs of different regions in the training heat map 130.

A temperature counter of the target region may be incremented at block 218. For example, once the target region is identified, the temperature counter corresponding to the target region of the training heat map 130 may be incremented.

The training heat map may be updated at block 220. For example, the training heat map 130 may be updated based on the updated temperature of the target region of the training heat map 130. In one or more embodiments, the blocks 218 and 220 may be performed concurrently (e.g., at the same time or substantially simultaneously). For example, in one or more embodiments, concurrently with increment of the temperature counter of the target region, the training heat map may be updated.

Blocks 202 to 220 may continue in a loop during the training period of the training heat map 130.

From block 214, the method 200 may continue to block 222, where it is determined if a trigger is satisfied. In one or more embodiments, a condition that satisfies the trigger may be set (or predefined) by the finite state machine or the heat map training circuit 103 of the storage device 102. For example, in block 222, the condition to satisfy the trigger may be a predefined time interval (e.g., in case of unconditional periodic switching of the heat maps in every 10 minutes), a threshold value of the cache hit, and/or the like.

If so (e.g., YES at block 222), the serving heat map may be switched with the training heat map at block 224, and the method 200 may end. For example, the training heat map 130 may be switched with the serving heat map 120 by a switch trigger 160 of the finite state machine or the heat map training circuit 103 of the storage device 102.

For example, in one or more embodiments, the training heat map 130 may be switched with the serving heat map 120 periodically (e.g., unconditional periodic switching every 10 minutes). In one or more embodiments, the switching between the training heat map 130 and the serving heat map 120 may be initiated by the switch trigger 160 based on instructions from the finite state machine or the heat map training circuit 103 of the storage device 102. In one or more embodiments, the hit or miss statistics from the host device 101 may be used for performance evaluation of the serving heat map 120, and/or to switch the serving heat map 120 with the training heat map 130. For example, if the cache hit rate is lower than a threshold value, the training heat map 130 may be switched with the serving heat map 120. The threshold value of the cache hit for switching the training heat map 130 with the serving heat map 120 may be determined by the finite state machine or the heat map training circuit 103. As such, in block 222, a condition to satisfy the trigger may be a predefined time interval (e.g., in case of unconditional periodic switching of the heat maps in every 10 minutes), a threshold value of the cache hit, and/or the like.

If not (e.g., NO at block 222), the training period of the training heat map and the prefetching based on the serving heat map may be restarted (e.g., based on receiving a new read or write request from the host device at block 202), and the method 200 may return to block 202. For example, for each read or write request received from the host device at block 202, a lookup may be performed in the serving heat map 120 at block 204. Based on the temperature of the target region, different numbers of SSD read requests (e.g., prefetch request) may be generated (e.g., at 210). For example, for each iteration of 202 to 222, one lookup (e.g., lookup in the serving heat map 120) may be performed. After block 224 is completed, the method 200 may end.

According to one or more embodiments of the present disclosure, the heat map (e.g., the training heat map 130) generated by the finite state machine or the heat map training circuit 103 according to the methods described above with reference to FIG. 1B and FIG. 2 may monitor traffic on the bus 110 in real time, and may create the most up to date heat map of the storage device (e.g., an SSD) in the background. The granularity of the serving and the training heat maps 120 and 130 may be adjusted by the finite state machine or the heat map training circuit 103 based on the available on-chip resources. Further, because the training heat map is generated by the hardware (e.g., the finite state machine or the heat map training circuit 103), no extra system overhead or extra load on the system (e.g., the host device 101) may be created. Because, switching between the training heat map 130 and the serving heat map 120 may be a relatively simple and clean cut operation, this can be done by the finite state machine or the heat map training circuit 103 without any intervention from the host processor 106.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A method of prefetching from a storage device connected to a host device, the method comprising:
  determining, by the storage device, a first region in a first heat map of the storage device, the first region in the first heat map comprising an address associated with an instruction received by the storage device from the host device;
  generating, by the storage device, a prefetch request based on a temperature of the first region of the first heat map, the temperature of the first region of the first heat map corresponding to a number of times the first region of the first heat map is accessed by the host device;
  prefetching, by the storage device, data or instructions stored at an address of the storage device corresponding with the first region of the first heat map based on the prefetch request and associated with the instruction received by the storage device;
  updating, by the storage device, a second heat map based on the instruction received from the host device;
  determining, by the storage device, based on information received from the host device that a rate of the prefetched data or instructions from the first region of the first heat map that are used by the host device is less than a threshold value; and
  switching, by the storage device, the second heat map with the first heat map.

2. The method of claim 1, further comprising:
  determining, by the storage device, a first region in the second heat map of the storage device, the first region in the second heat map comprising the address associated with the instruction received from the host device; and
  incrementing, by the storage device, a temperature counter of the first region of the second heat map, a value of the temperature counter representing the temperature of the first region of the second heat map, and updating, by the storage device, the second heat map based on the value of the temperature counter of the first region of the second heat map,
  wherein the temperature of the first region of the second heat map corresponds to a number of times the first region of the second heat map is accessed by the host device.

3. The method of claim 2, wherein the first region in the first heat map and the first region of the second heat map are determined based on corresponding region IDs of the first region in the first heat map and the first region of the second heat map.

4. The method of claim 1, wherein the prefetching further comprising sending, by the storage device, the prefetched data or instructions from the first region of the first heat map to the host device; and
  wherein the first heat map and the second heat map represent heat maps of the storage device at different times.

5. The method of claim 1, wherein the storage device is configured to update the second heat map based on the instruction received from the host device during a time period determined by the storage device.

6. The method of claim 1, wherein the instruction from the host device is received via a cache-coherent interconnect coupled between the host device and the storage device.

7. The method of claim 1, wherein the storage device comprises at least one of a finite state machine or a storage device controller.

8. The method of claim 1, wherein a size of each of a plurality of regions in the first heat map is different from a size of each of a plurality of regions in the second heat map.

9. A system comprising:
  a host device; and
  a storage device communicatively coupled to the host device via a bus, the storage device being configured to:
    determine a first region in a first heat map of the storage device based on an instruction received by the storage device from the host device;
    generate a prefetch request based on a number of times the first region of the first heat map is accessed by the host device;
    prefetch data or instructions stored at an address of the storage device corresponding with the first region of the first heat map based on the prefetch request and associated with the instruction received by the storage device;
    send the prefetched data or instructions from the first region of the first heat map to the host device;
    update a second heat map of the storage device based on the instruction received from the host device;
    determine based on information received from the host device that a rate of the prefetched data or instructions from the first region of the first heat map that are used by the host device is less than a threshold value; and
    switch the second heat map with the first heat map based on determining that the rate of the prefetched data or instructions from the first region of the first heat map is less than the threshold value.

10. The system of claim 9, wherein the first region in the first heat map comprises an address associated with the instruction received by the storage device from the host device.

11. The system of claim 9, wherein the storage device is further configured to:
  determine a first region in the second heat map of the storage device, the first region in the second heat map comprising an address associated with the instruction received from the host device; and
  increment a temperature counter of the first region of the second heat map, a value of the temperature counter representing a temperature of the first region of the second heat map, and update the second heat map based on the value of the temperature counter of the first region of the second heat map, wherein the temperature of the first region of the second heat map corresponds to a number of times the first region of the second heat map is accessed by the host device.

12. The system of claim 11, wherein the first region in the first heat map and the first region of the second heat map are determined based on corresponding region IDs of the first region in the first heat map and the first region of the second heat map.

13. The system of claim 9, wherein the first heat map and the second heat map represent heat maps of the storage device at different times.

14. The system of claim 9, wherein the storage device is configured to update the second heat map based on the instruction received from the host device during a time period determined by the storage device.

15. The system of claim 9, wherein the bus comprises a cache-coherent interconnect coupled between the host device and the storage device.

16. The system of claim 9, wherein the storage device comprises at least one of a finite state machine or a storage device controller, and the storage device comprises a solid state drive.

17. A non-transitory computer readable medium comprising stored instructions, which when executed by a storage device, cause the storage device to:

determine a first region in a first heat map of the storage device based on an instruction received by the storage device from a host device connected to the storage device;

generate a prefetch request based on a number of times the first region of the first heat map is accessed by the host device;

prefetch data or instructions stored at an address of the storage device corresponding with the first region of the first heat map based on the prefetch request and associated with the instruction received by the storage device;

send the prefetched data or instructions from the first region of the first heat map to the host device;

update a second heat map of the storage device based on the instruction received from the host device;

determine based on information received from the host device that a rate of the prefetched data or instructions from the first region of the first heat map that are used by the host device is less than a threshold value; and switch the second heat map with the first heat map based on determining that the rate of the prefetched data or instructions from the first region of the first heat map is less than the threshold value.

18. The non-transitory computer readable medium of claim 17, wherein the storage device comprises at least one of a finite state machine or a storage device controller, and the storage device comprises a solid state drive.

* * * * *